United States Patent
Yang et al.

(10) Patent No.: US 11,251,729 B2
(45) Date of Patent: Feb. 15, 2022

(54) DEVICE AND METHOD FOR OVER-CURRENT PROTECTION

(71) Applicant: Infinno Technology Corp., Hsinchu County (TW)

(72) Inventors: Hui-Tsung Yang, Hsinchu County (TW); Ming-Zhi Tzeng, Hsinchu County (TW)

(73) Assignee: Infinno Technology Corp., Hsinchu County (TW)

( * ) Notice: Subject to any disclaimer, the term of this patent is extended or adjusted under 35 U.S.C. 154(b) by 0 days.

(21) Appl. No.: 16/459,630

(22) Filed: Jul. 2, 2019

(65) Prior Publication Data

US 2020/0119673 A1 Apr. 16, 2020

Related U.S. Application Data

(60) Provisional application No. 62/693,419, filed on Jul. 2, 2018.

(51) Int. Cl.
*H02P 9/00* (2006.01)
*H02P 9/02* (2006.01)

(52) U.S. Cl.
CPC ............... *H02P 9/006* (2013.01); *H02P 9/02* (2013.01)

(58) Field of Classification Search
CPC .......... H02P 9/006; H02P 9/02; H02P 29/027; H02H 9/02
See application file for complete search history.

(56) References Cited

U.S. PATENT DOCUMENTS

| | | | | |
|---|---|---|---|---|
| 4,432,031 A * | 2/1984 | Premerlani | ............ | H02H 6/005 361/63 |
| 5,625,276 A | 4/1997 | Scott | | |
| 9,450,401 B2 | 9/2016 | Li | | |
| 2003/0122530 A1* | 7/2003 | Hikita | ...................... | G05F 1/573 323/285 |
| 2012/0170165 A1* | 7/2012 | Jung | ........................ | H02H 3/20 361/86 |
| 2013/0069564 A1* | 3/2013 | Kaidu | ........................ | H02P 6/28 318/139 |
| 2018/0041111 A1* | 2/2018 | Chan | ......................... | H02H 9/02 |

FOREIGN PATENT DOCUMENTS

| | | | | |
|---|---|---|---|---|
| CN | 1910529 A | 2/2007 | | |
| CN | 101060242 A | 10/2007 | | |
| CN | 101232237 A | 7/2008 | | |
| CN | 101295872 B | * 4/2010 | ............... | H02H 7/12 |
| CN | 102244378 A | 11/2011 | | |
| CN | 103972876 A | 8/2014 | | |
| WO | 2008/153631 A1 | 12/2008 | | |

* cited by examiner

*Primary Examiner* — Bickey Dhakal
(74) *Attorney, Agent, or Firm* — Winston Hsu

(57) ABSTRACT

An over-current protection device for a power generator includes a first pin, configured to receive a signal; a detection and control module, coupled to the first pin, and configured to detect the signal to determine whether the signal conforms to a pre-determined condition or not, and to output a control signal when the signal conforms to the pre-determined condition; and an auto-trim and memory module, coupled to the detection and control module, and configured to receive the control signal from the detection and control module for executing corresponding auto-trim measurements and storing corresponding adjustment data.

8 Claims, 9 Drawing Sheets

DEVICE AND METHOD FOR OVER-CURRENT PROTECTION

CROSS REFERENCE TO RELATED APPLICATION

This application claims the benefit of U.S. provisional application No. 62/693,419, which was filed on 2018 Jul. 2 and is included herein by reference in its entirety.

BACKGROUND OF THE INVENTION

1. Field of the Invention

The present invention relates to a device and method for over-current protection, and more particularly, to a device and method for over-current protection by load current or load voltage.

2. Description of the Prior Art

A power generator is utilized for supplying power to an electronic device. In order to avoid the power generator providing over (excess) current to the electronic device, an over-current protection device is usually implemented in the power generator, which can detect a load current to inform the power generator to take over-current protection measurements when the load current is too high. This implementation requires a specific control pin for the power generator in order to set functions, e.g. on/off, over-current protection point or power good output (PGO). When the specific control pin of the power generator is removed, the above functions cannot be set, and therefore it cannot be effectively determined whether a load current is too high. Improvements to the prior art are required.

SUMMARY OF THE INVENTION

In order to solve the above mentioned problems, the present invention provides a device and method for over-current protection capable of receiving signals related to status settings of the over-current protection device without implementing extra control pins.

In an aspect, the present invention discloses An over-current protection device for a power generator, comprising: a first pin, configured to receive a signal; a detection and control module, coupled to the first pin, and configured to detect the signal to determine whether the signal conforms to a pre-determined condition or not, and to output a control signal, when the signal conforms to the pre-determined condition; and an auto-trim and memory module, coupled to the detection and control module, configured to receive the control signal from the detection and control module to execute corresponding auto-trim measurements and to store corresponding adjustment data.

In another aspect, the present invention discloses an over-current protection method for a power generator, comprising: receiving a signal; detecting a voltage level, a voltage waveform, a voltage frequency, a voltage duty cycle, a current size, a current frequency or a current variation cycle of the signal to determine whether the signal conforms to a pre-determined condition or not; outputting a control signal, when the signal conforms to the pre-determined condition; and executing corresponding auto-trim measurements and storing corresponding adjustment data according to the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
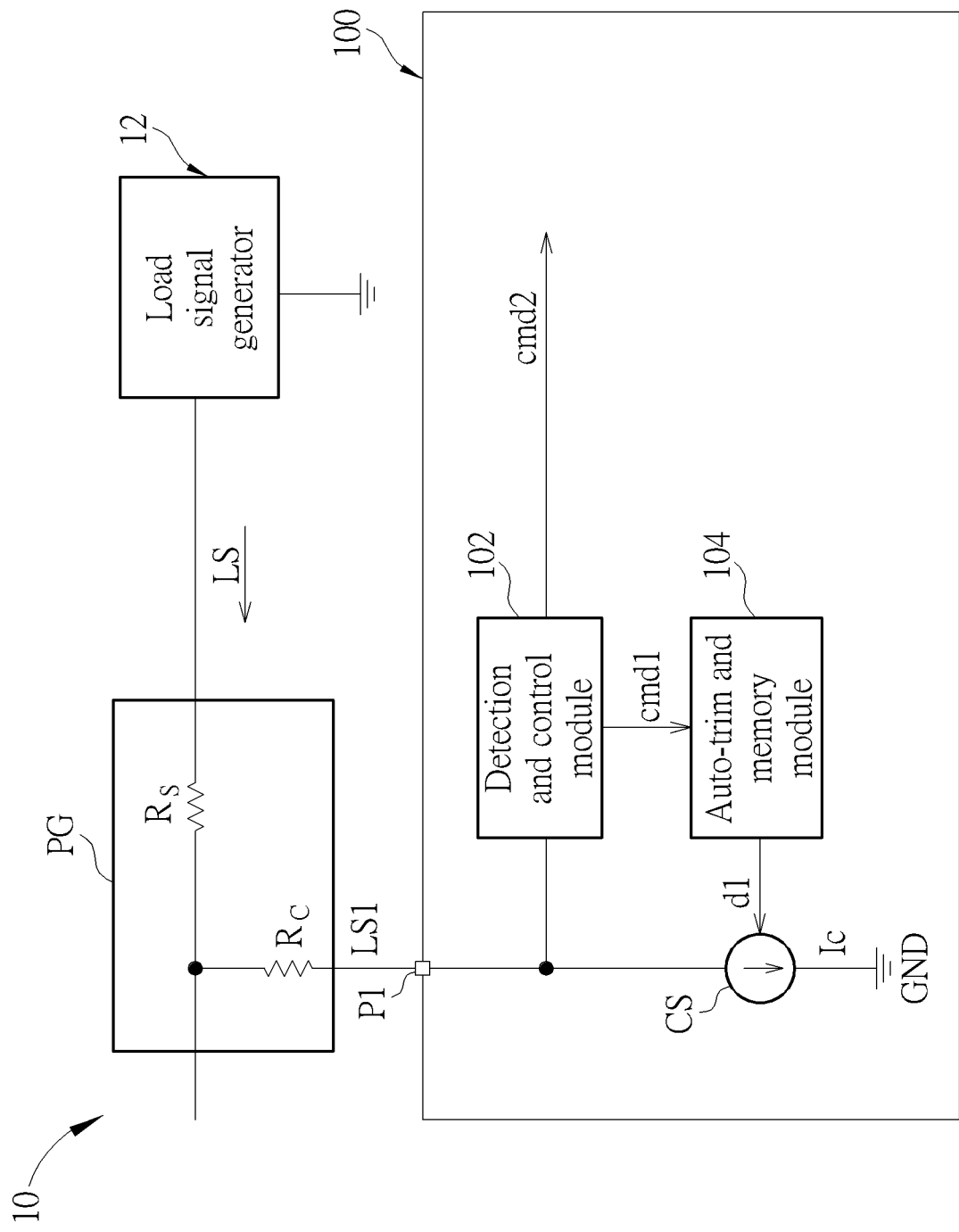
FIG. 1 is a schematic diagram of an over-current protection circuit according to an embodiment of the present invention.

FIG. 1 is a schematic diagram of an over-current protection circuit 10 according to an embodiment of the present invention. The over-current protection circuit 10 may be utilized in a power generator PG which includes an over-current protection device 100 and a load signal generator 12, wherein the power generator PG may be a power supplier, or in a power supplier including the power generator PG and the over-current protection device 100. The load signal generator 12 may consist of a load machine (not depicted in the figure) and/or a signal generator (not depicted in the figure). The load machine may generate a signal LS of current type, and the signal generator may generate a signal LS of voltage type, such that the signal LS generated by the load signal generator 12 may be a voltage signal and/or a current signal. The over-current protection device 100 may be an over-current protection chip, which includes a first pin P1, a detection and control module 102, an auto-trim and memory module 104 and a variable current source CS. The first pin P1 is configured to receive the signal LS generated by the load signal generator 12. The detection and control module 102 is coupled to the first pin P1, for detecting a voltage level, a voltage waveform, a voltage frequency, a voltage duty cycle, a current size, a current frequency or a current variation cycle of the signal LS to determine whether the signal LS conforms to a predetermined condition or not, so as to output a control signal cmd1 when the signal LS conforms to the predetermined condition. In addition, the detection and control module 102 may further output a control signal cmd2 to control other circuits (not depicted in the figure) inside the over-current protection device 100. The auto-trim and memory module 104 is coupled to the detection and control module 102, for receiving the control signal cmd1 from the detection and control module 102, so as to accordingly generate adjustment data d1 and execute corresponding auto-trim measurements. The auto-trim and memory module 104 includes a memory unit (not depicted in the figure) for storing the adjustment data d1. The variable current source CS is coupled to the first pin P1, the detection and control module 102 and the auto-trim and memory module 104 for adjusting a current Ic according to the adjustment data d1.

In an embodiment, the power generator PG includes resistors Rs, Rc. The load signal generator 12 is configured to generate the signal LS. A signal LS1 is generated after the signal LS passes the power generator PG The first pin P1 of the over-current protection device 100 receives the signal LS1, and the detection and control module 102 detects the signal LS1 to generate the control signal cmd1 corresponding to the auto-trim measurements according to the predetermined condition, which is then transmitted to the auto-trim and memory module 104, wherein the predetermined condition may be whether the voltage level, the voltage waveform, the voltage frequency or the voltage duty cycle of the signal LS1 is higher than a default value over a specific period or not. For example, the detection and control module 102 may detect whether the voltage level of the signal LS1 is higher than a voltage VH. When the detection and control module 102 detects that the voltage level of the signal LS1 is higher than the voltage VH for a default time, e.g. 10 ms, 20 ms or 30 ms, the detection and control module 102 generates the control signal cmd1 corresponding to the auto-trim measurements and transmits the control signal cmd1 to the auto-trim and memory module 104. The auto-trim and memory module 104 generates the adjustment data d1 according to the control signal cmd1 so as to execute the corresponding auto-trim measurements and store the corresponding adjustment data d1. Therefore, the over-current protection device 100 according to an embodiment of the present invention may detect the voltage level, the voltage waveform, the voltage frequency or the voltage duty cycle of the signal LS1 or LS through the first pin P1, without implementing extra pins to receive commands of over-current protection or status setting data, such that the detection and control module 102 may detect the signal LS1 or LS and the auto-trim and memory module 104 may execute corresponding auto-trim measurements and store the corresponding adjustment data. In another embodiment, the first pin P1 of the over-current protection device 100 may receive the signal LS generated by the load signal generator 12 as described in the above embodiment, and the detection and control module 102 may generate the control signal cmd1 corresponding to the auto-trim measurements according to the predetermined condition of the signal LS and transmit the control signal cmd1 to the auto-trim and memory module 104, so as to execute corresponding auto-trim measurements and store the corresponding adjustment data.

Figure 2:
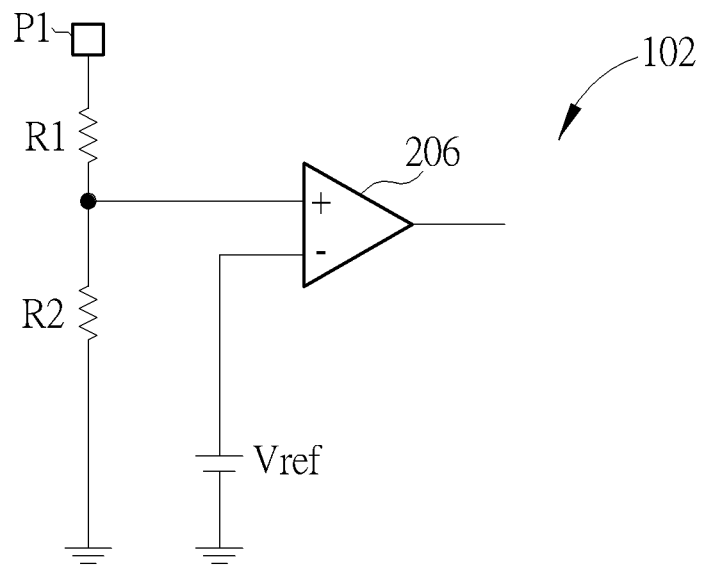
FIG. 2 to FIG. 4 are circuit diagrams of a detection and control module of an over-current protection circuit in FIG. 1 according to an embodiment of the present invention.

Refer to FIG. 2, which is a circuit diagram of the detection and control module 102 of the over-current protection device 100 according to an embodiment of the present invention. As shown in FIG. 2, the detection and control module 102 may consist of a comparator 206, resistors R1, R2 and a reference voltage Vref. In this embodiment, the detection and control module 102 is coupled to the first pin P1. A division ratio of the resistors R1, R2 may be utilized for measuring a high voltage level of the signal LS1, such that the detection and control module 102 may compare a voltage of the received signal LS1 with that of the reference voltage Vref to detect a highest voltage. In other words, the detection and control module 102 may detect the voltage level of the signal LS from the load signal generator 12.

Figure 3:
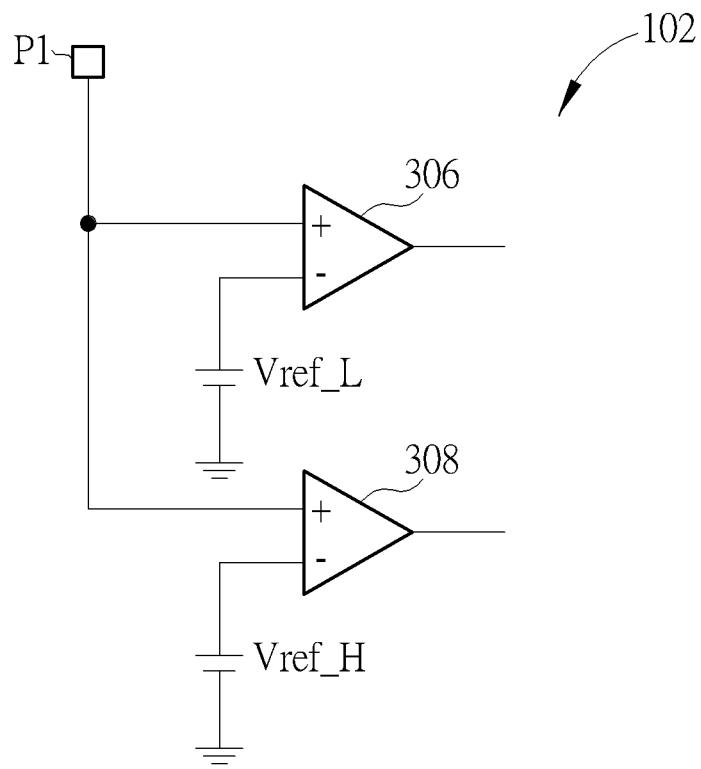

FIG. 3 is a circuit diagram of the detection and control module 102 of the over-current protection device 100 according to another embodiment of the present invention. As shown in FIG. 3, the detection and control module 102 consists of comparators 306, 308 and reference voltages Vref_H, Vref_L. In this embodiment, the detection and control module 102 is coupled to the first pin P1, such that the detection and control module 102 may respectively compare a voltage of the received signal LS1 with the reference voltages Vref_H, Vref_L to detect a highest voltage level and a lowest voltage level. Therefore, when the detection and control module 102 detects that the voltage level of the signal LS1 is higher than Vref_H or lower than the reference voltage Vref_L, the control signal cmd1 corresponding to the auto-trim measurements is generated and is transmitted to the auto-trim and memory module 104, so as to execute corresponding auto-trim measurements and store the corresponding adjustment data.

Figure 4:
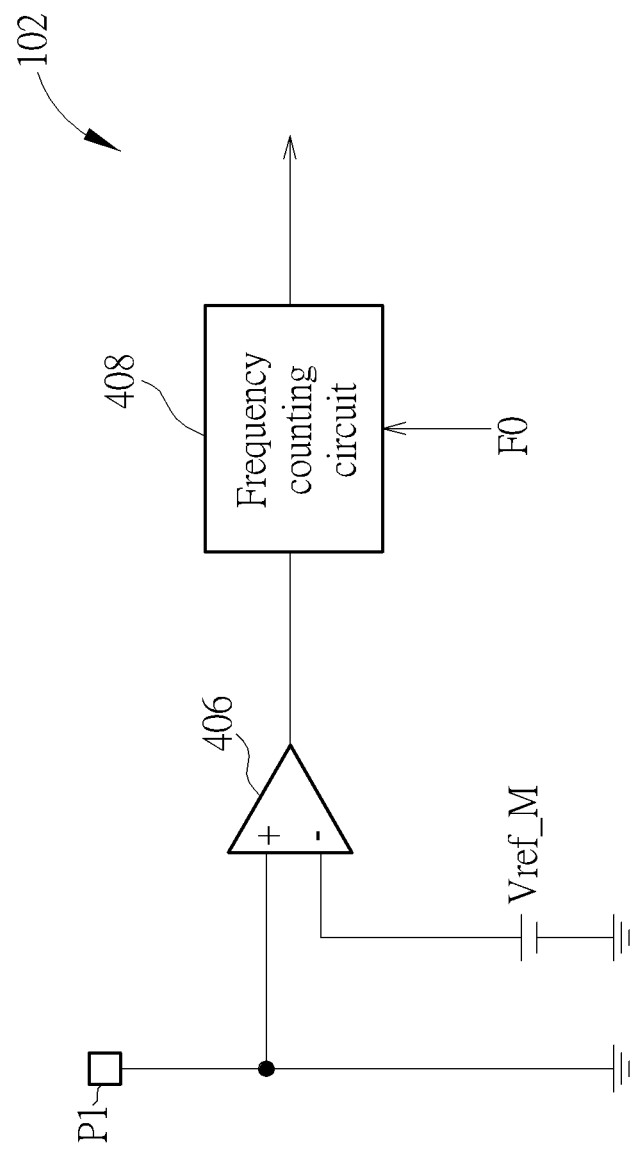

In another embodiment, the detection and control module 102 may consist of a comparator 406, a frequency counting circuit 408a and a reference voltage Vref_M, as shown in FIG. 4. In this embodiment, the detection and control module 102 is coupled to the first pin P1, such that the detection and control module 102 may compare a voltage waveform of the received signal LS1 with that of the reference voltage Vref_M and the frequency counting circuit 408 may perform sampling for the voltage waveform at a frequency F0 to determine a voltage frequency and a voltage duty cycle of the voltage waveform. Therefore, when the detection and control module 102 detects that the voltage frequency or the voltage duty cycle of the signal is different, the control signal cmd1 may be generated corresponding to the auto-trim measurements and is transmitted to the auto-trim and memory module 104.

For example, a high voltage level and a low voltage level of the voltage waveform of the signal LS1 may be respectively decoded as a digital signal 1 and a digital signal 0, i.e. the voltage waveform may be transformed into a square waveform by the comparator 406, and the square waveform is inputted to the frequency counting circuit 40 for sampling at frequency F0. As such, when the detection and control module 102 detects the voltage waveform of the signal LS1 and decodes the digital signals, the detection and control module 102 generates the control signal cmd1 corresponding to the auto-trim measurements according to the digital signals, and transmits the control signal cmd1 to the auto-trim and memory module 104. Notably, the detection and control module 102 may detect a frequency or a voltage duty cycle of the voltage waveform of the signal LS1 to generate the control signal cmd1 corresponding to the auto-trim measurements.

Figure 5:
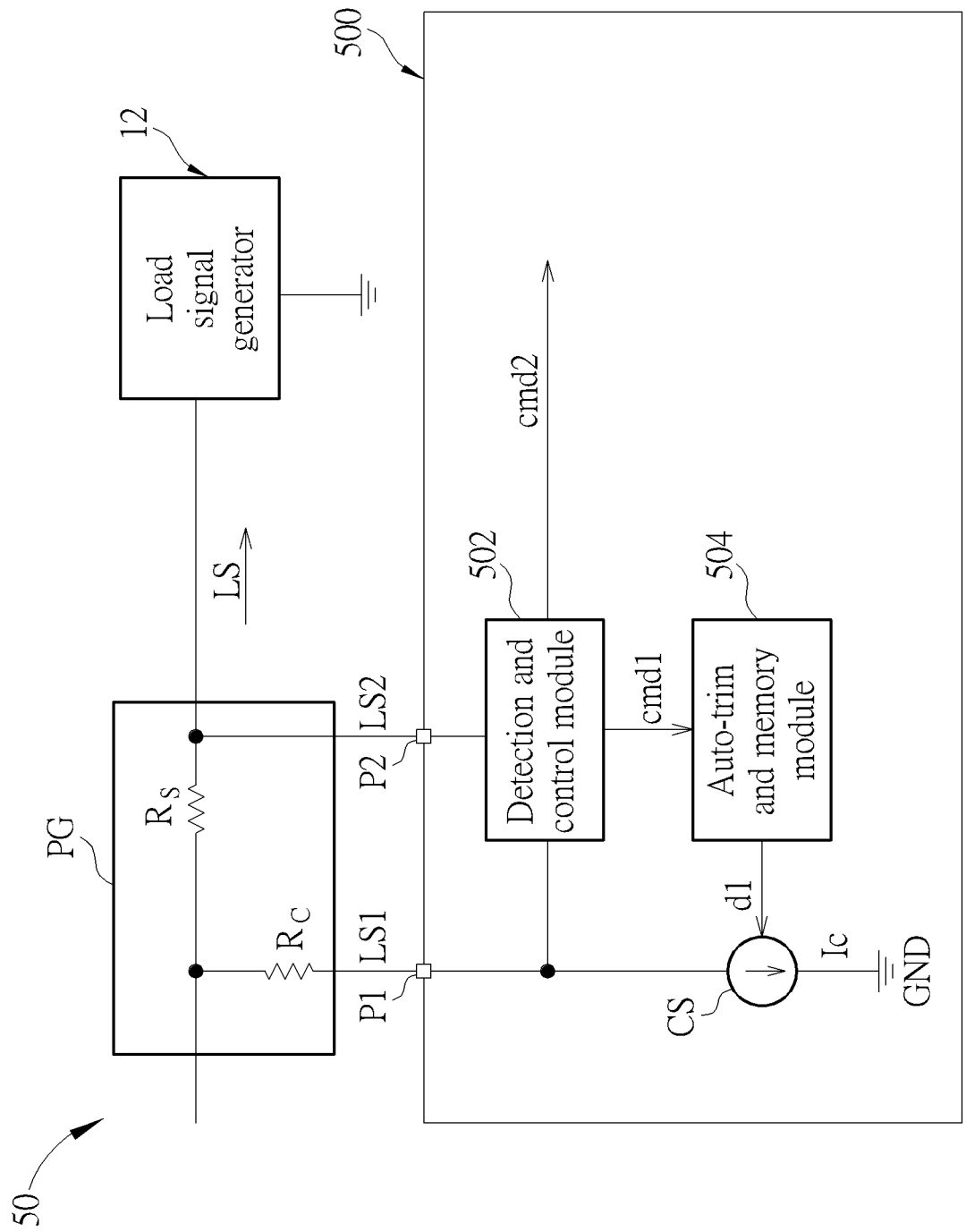
FIG. 5 is a schematic diagram of another over-current protection circuit according to an embodiment of the present invention.

FIG. 5 is a schematic diagram of an over-current protection circuit 50 according to an embodiment of the present invention. The over-current protection circuit 50 includes a load signal generator 12, a power generator PG and an over-current protection device 500. The over-current protection device 500 includes a first pin P1, a second pin P2, a detection and control module 502, an auto-trim and memory module 504 and a variable current source CS. Compared with the over-current protection device 100 in FIG. 1, the over-current protection device 500 further includes the second pin P2, which is coupled to the detection and control module 102 to receive a signal LS2. The detection and control module 502 respectively receives the signals LS1 and LS2 by the first pin P1 and the second pin P2 to detect a current signal of the signal LS by a voltage across the first pin P1 and the second pin P2. When the signal LS conforms to the predetermined condition, the detection and control module 502 outputs the control signal cmd1 to the auto-trim and memory module 504. As shown in FIG. 5, when the load signal generator 12 changes the current of the signal LS, the detection and control module 502 may determine the current signal of the signal LS according to a voltage difference, since the voltage difference exists between the first pin P1 and the second pin P2. Thus, when the detection and control module 502 detects that a current value of the current signal is higher than a default value for a specific period, the detection and control module 502 generates the control signal cmd1 corresponding to the auto-trim measurements and transmits the control signal cmd1 to the auto-trim and memory module 504 to execute corresponding auto-trim measurements and store the corresponding adjustment data.

Figure 6:
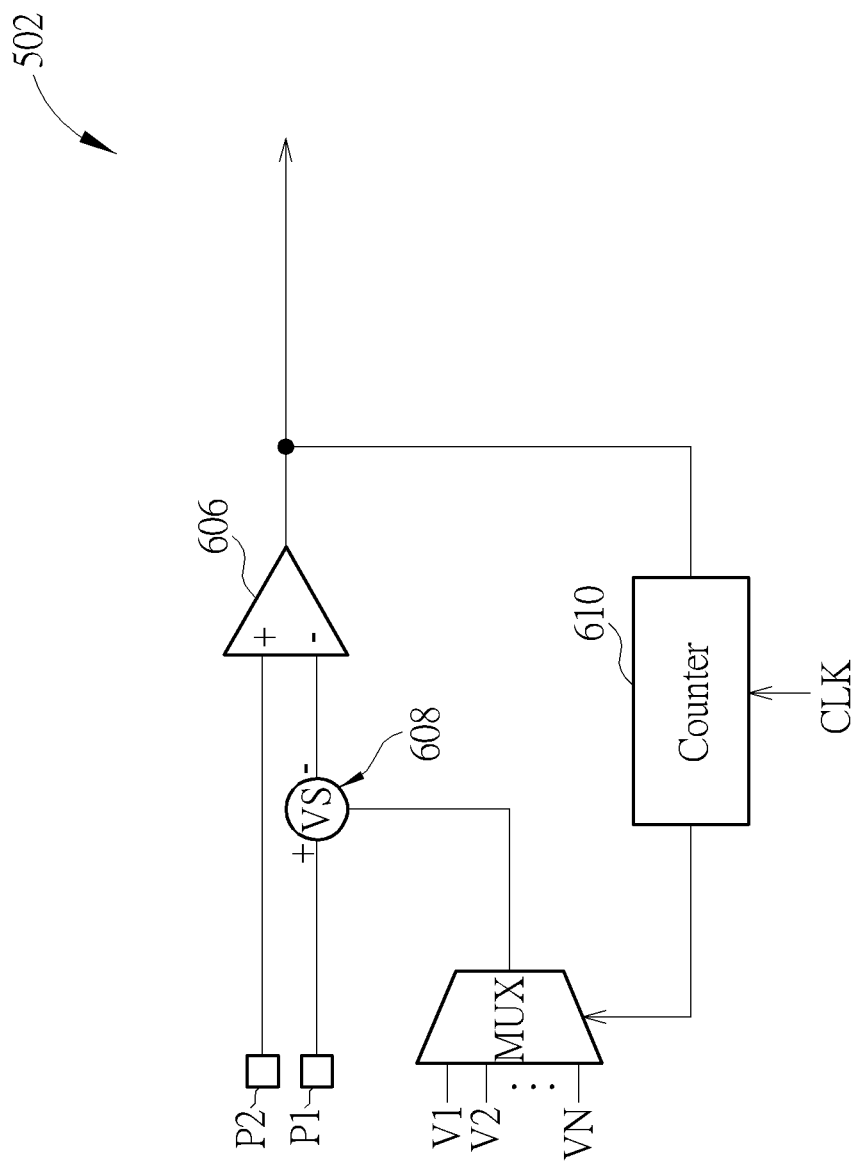
FIG. 6 and FIG. 7 are circuit diagrams of a detection and control module of the over-current protection circuit in FIG. 5 according to an embodiment of the present invention.

Notably, the detection and control module 502 may detect the current size, the current frequency or the current variation cycle of the signal LS to generate the control signal cmd1 corresponding to the auto-trim measurements. FIG. 6 is a circuit diagram of the detection and control module 502 of the over-current protection device 500 according to an embodiment of the present invention. In FIG. 6, the detection and control module 502 includes a differential comparator 606, a multiplexer MUX, a voltage adder 608 and a counter 610, wherein the multiplexer MUX selects one of reference voltages V1-VN according to the counter 610, e.g. the reference voltage V1, and the voltage adder 608 may output a sum voltage of the reference voltage V1 and the signal LS1 to the differential comparator 606, so as to compare a voltage difference between the first pin P1 and the second pin P2. The counter 610 counts an output signal of the differential comparator 606 based on a clock CLK. In this embodiment, whenever the differential comparator outputs the high voltage level to the counter 610, i.e. the voltage of the second pin P2 is higher than the voltage of the sum of the first pin P1 and the selected reference voltage, the multiplexer MUX adjusts its reference voltage, e.g. the reference voltage V1 is adjusted to the reference voltage V2 and so on, until the differential comparator 606 outputs the low voltage level, i.e. the voltage of the second pin P2 is lower than the voltage of the sum of the first pin P1 and the selected reference voltage. Therefore, the detection and control module 502 may detect the current value of the signal by the voltage across the first pin P1 and the second pin P2.

Figure 7:
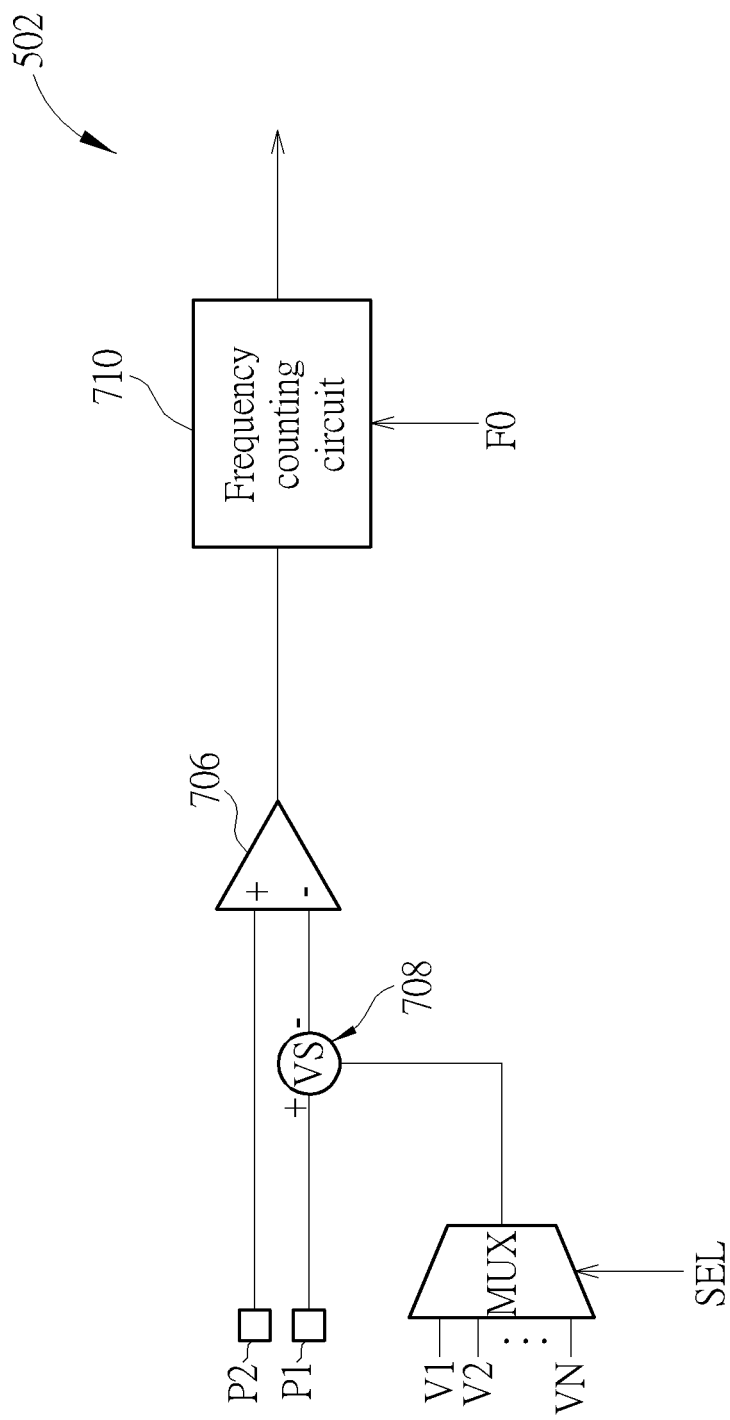

FIG. 7 is a circuit diagram of the detection and control module 502 of the over-current protection device 500 according to another embodiment of the present invention. The detection and control module 502 may consist of a differential comparator 706, a multiplexer MUX, a voltage adder 708 and a frequency counting circuit 710. In this embodiment, the detection and control module 502 is coupled to the first pin P1 and the second pin P2. The detection and control module 502 detects a voltage across the first pin P1 and the second pin P2 to detect the current waveform. The detection and control module 502 selects one of the reference voltages V1-VN of the multiplexer MUX, e.g. the reference voltage V1, and the voltage adder 708 may output a sum voltage of the reference voltage V1 and the signal LS1, to compare with the signal LS2 of the second pin P2. Then, the frequency counting circuit 710 performs sampling for the current waveform at the frequency F0 to determine a current frequency or a current duty cycle of the current waveform. Thus, when the detection and control module 502 detects signals with different current frequency or different current duty cycle, the control signal corresponding to different auto-trim measurements may be generated to the auto-trim and memory module 504.

Figure 8:
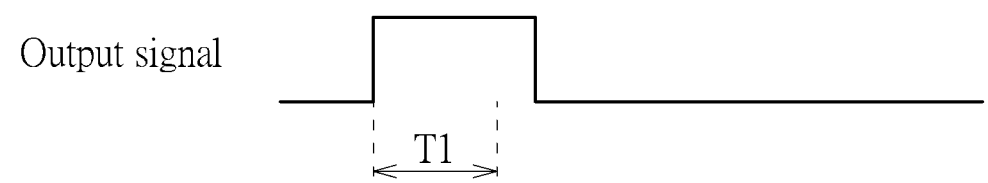
FIG. 8 and FIG. 9 are schematic diagrams of an output signal of a comparator according to an embodiment of the present invention.
Figure 8:
Figure 8:
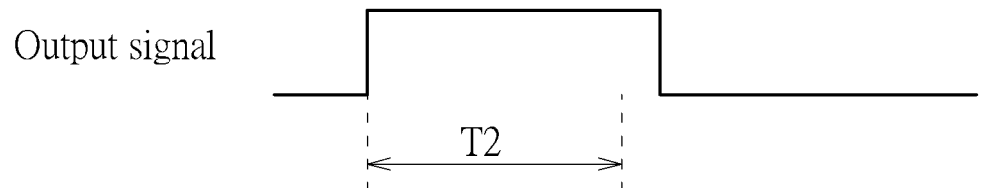
Figure 8:

The detection and control module according to an embodiment of the present invention may generate the control signal cmd1 corresponding to the auto-trim measurements to the auto-trim and memory module, when the detection and control module detects the signal of different voltage frequency or different current duty cycle. Alternatively, the detection and control module according to an embodiment of the present invention may further output the control signal cmd2 to control other circuits inside the over-current protection circuit 10. In an embodiment, when the output signal of the comparator 406 in FIG. 4 and the differential comparator 706 in FIG. 7 is the waveform shown in FIG. 8, i.e. when the output signal of the comparator 406 or the differential comparator 706 is at a HIGH voltage level, the frequency counting circuits 408, 710 detect waveform width of its output signal to determine the corresponding control signal. For example, when the output signal is at the HIGH voltage level for over a period of time T1, the frequency counting circuits 408, 710 may output the control signal cmd1 to the auto-trim and memory module. In another example, when the output signal is at the HIGH voltage level for over a period of time T2, the frequency counting circuits 408, 710 may output the control signal cmd2 to control other circuits inside the over-current protection circuit 10. Notably, the control signals corresponding to the output signal are not limited to the above examples and may be modified according to requirements of a system or a user, so as to correspond to different commands with different waveforms.

Figure 9:
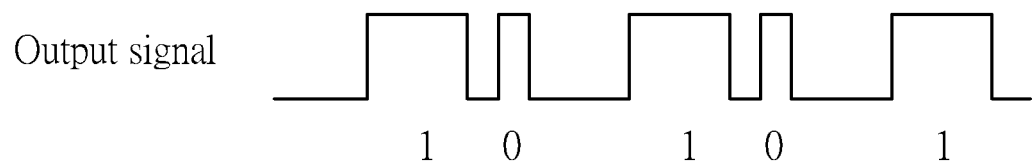
Figure 9:

In another embodiment, when the output signal of the comparator 406 or differential comparator 706 is the waveform shown in FIG. 9, the frequency counting circuits 408, 710 may detect the duty cycle of waveform of its output signal to determine the corresponding control signal. For example, when the output signal is a digital series 10101, the frequency counting circuits 408, 710 may output the control signal cmd1 to the auto-trim and memory module. In another example, when the output signal is a digital series 10111 (not depicted in the figure), the frequency counting circuits 408, 710 may output the control signal cmd2 to control other circuits inside the over-current protection circuit 10. Notably, the control signals corresponding to the output signal are not limited to the above examples and may be modified according to requirements of a system or a user, so as to correspond to different commands with different digital series.

Figure 10:
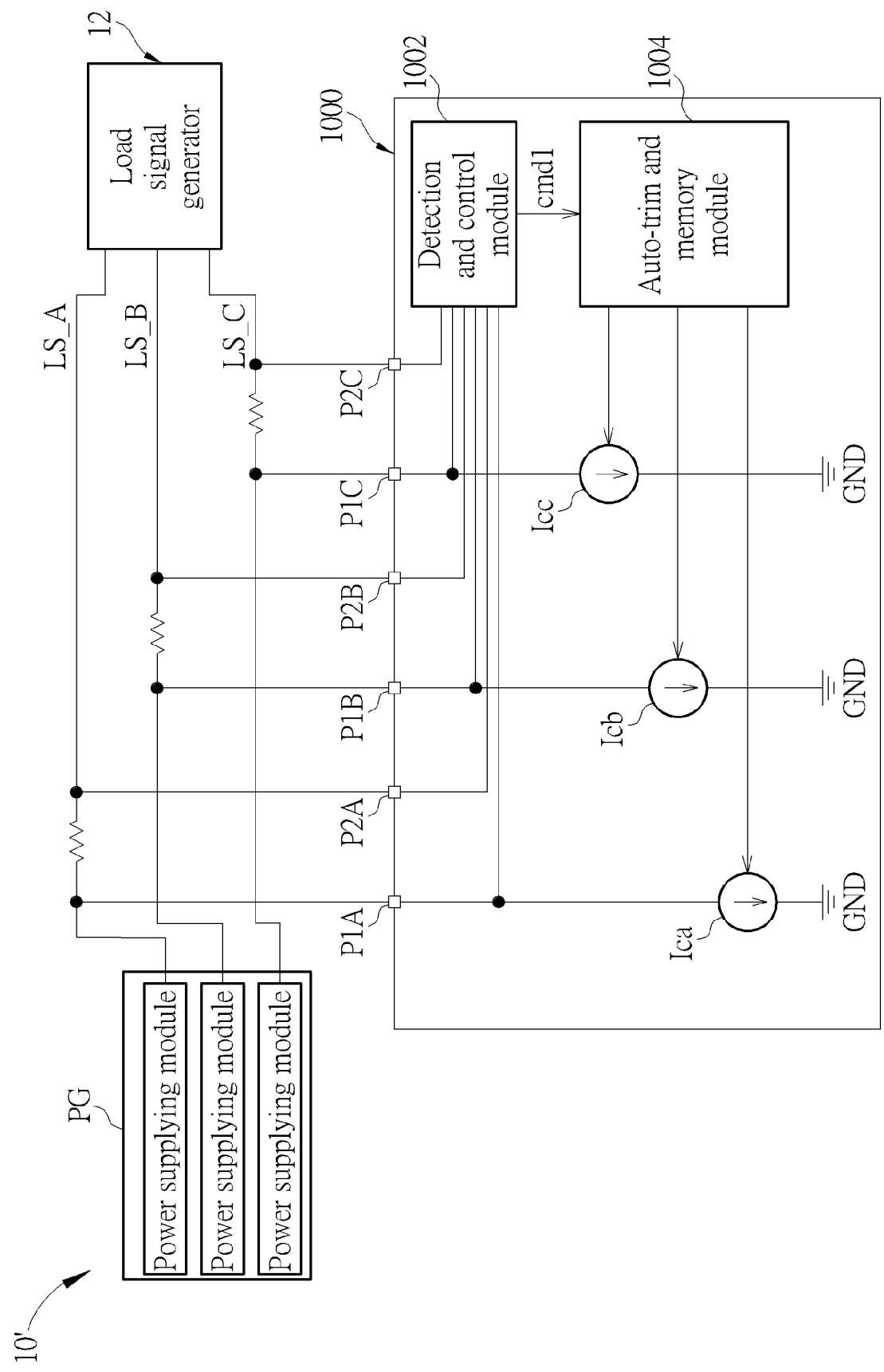
FIG. 10 is a schematic diagram of an over-current protection circuit according to an embodiment of the present invention

Refer to FIG. 10, which is a schematic diagram of an over-current protection circuit 10' according to an embodiment of the present invention. The over-current protection circuit 10' includes a load signal generator 12 and an over-current protection device 1000, wherein the over-current protection device 1000 includes a detection and control module 1002 and an auto-trim and memory module 1004 for being applied to the power generator PG with a plurality of power supplying modules. In this embodiment, the load signal generator 12 may output the signals LS_A, LS_B and LS_C to corresponding power supplying modules. The detection and control module 1002 may receive signals with multiple voltage waveforms or current waveforms through the first pins P1A, P1B, P1C and the second pins P2A, P2B, P2C corresponding to different power supplying modules, so as to decode and output the control signal to multiple power supplying modules for determining the working mode of the power supplying modules. Notably, the over-current protection device 1000 may be simultaneously utilized for controlling the power generator PG with different amounts of power supplying modules and is not limited to the above embodiments.

Figure 11:
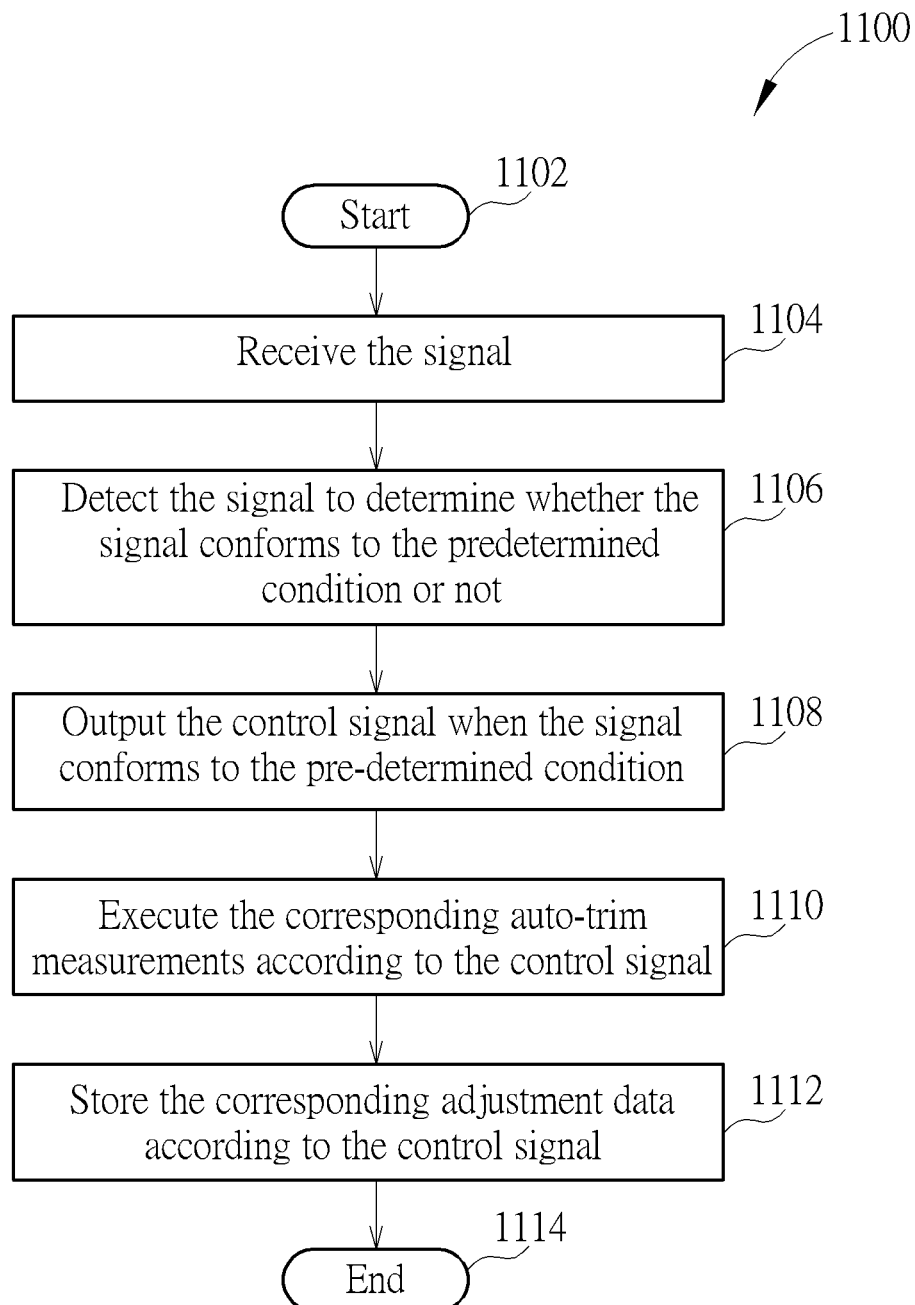
FIG. 11 is a schematic diagram of an over-current protection method according to an embodiment of the present invention.

An operation method of the over-current protection device of the present invention may be an over-current protection method 1100, as shown in FIG. 11. The over-current protection method 1100 includes the following steps:

Step 1102: Start.
Step 1104: Receive the signal.
Step 1106: Detect the signal to determine whether the signal conforms to the predetermined condition or not.
Step 1108: Output the control signal when the signal conforms to the pre-determined condition.
Step 1110: Execute the corresponding auto-trim measurements according to the control signal.
Step 1112: Store the corresponding adjustment data according to the control signal.
Step 1114: End.

The operation of the over-current protection method 1100 can be known by referring to the embodiments of the over-current protection device described above, and are therefore not repeated herein for brevity.

Notably, those skilled in the art may make modifications to properly design the over-current protection device based on different system requirements. For example, the circuit diagram of the detection and control module is not limited to the above embodiments. Other circuits, which may be utilized for detecting signals of the voltage waveform, current waveform, frequency, duty cycle of the signal, are all within the scope of the present invention. Alternatively, the second pin according to an embodiment of the present invention may be independently utilized for detecting a voltage signal of the signal and not limited thereto.

In summary, the present invention provides an over-current protection device and method thereof to obtain a control signal by changing load current and load voltage without implementing extra control pins to receive signals related to a setting status of the over-current protection device so as to set a working mode of the over-current protection device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An over-current protection device for a power generator, comprising:
a first pin, configured to receive a signal;
a detection and control module, coupled to the first pin, and configured to detect the signal to determine whether the signal conforms to a pre-determined condition or not, and to output a control signal when the signal conforms to the pre-determined condition; and
an auto-trim and memory module, coupled to the detection and control module, configured to receive the control signal from the detection and control module, wherein the auto-trim and memory module is configured to execute a plurality of auto-trim measurements and to store adjustment data corresponding to the plurality of auto-trim measurements;
wherein the signal is generated by a load signal generator, and the first pin is the only pin between the load signal generator and the detection and control module.

2. The over-current protection device of claim 1, wherein the detection and control module is configured to detect a voltage level, a voltage waveform, a voltage frequency, a voltage duty cycle, a current size, a current frequency or a current variation cycle of the signal.

3. The over-current protection device of claim 2, wherein the auto-trim and memory module is configured to store different auto-trim measurements corresponding to the control signal.

4. The over-current protection device of claim 1, wherein when the power generator comprises a plurality of power supplying modules, the detection and control module outputs the control signal to the auto-trim and memory module to determine working modes corresponding to the plurality of power supplying modules, wherein the working modes are an on setting, an off setting, or an over-current protection point setting of the plurality of power supplying modules.

5. An over-current protection method for a power generator, comprising:
receiving a signal from a first pin;
detecting a voltage level, a voltage waveform, a voltage frequency, a voltage duty cycle, a current size, a current frequency or a current variation cycle of the signal by a detection and control module to determine whether the signal conforms to a predetermined condition or not;
outputting a control signal from an auto-trim and memory module, when the signal conforms to the pre-determined condition; and
executing a plurality of auto-trim measurements and storing adjustment data corresponding to the plurality of auto-trim measurements according to the control signal;
wherein the signal is generated by a load signal generator, and the first pin is the only pin between the load signal generator and the detection and control module.

6. The over-current protection method of claim 5, further comprising:
detecting a current signal of the signal and outputting the control signal when the signal conforms to the pre-determined condition.

7. The over-current protection method of claim 6, further comprising:
detecting the voltage level, the voltage waveform, the voltage frequency or the voltage duty cycle of the signal at a predetermined period to determine whether the signal conforms to the pre-determined condition or not.

8. The over-current protection method of claim 5, wherein the control signal is a working mode related to the power generator, wherein the working mode is an on setting, an off setting, or an over-current protection point setting of the power generator.

* * * * *